US008641857B2

(12) United States Patent
Lesschaeve et al.

(10) Patent No.: US 8,641,857 B2
(45) Date of Patent: Feb. 4, 2014

(54) PROCESS FOR MANUFACTURING A FUEL TANK

(75) Inventors: Richard Lesschaeve, Wezembeek-Oppem (BE); Pierre-Francois Tardy, Brussels (BE); Yannick Gerard, Lasne (BE)

(73) Assignee: Inergy Automotive Systems Research (S.A.), Brussels (BE)

( * ) Notice: Subject to any disclaimer, the term of this patent is extended or adjusted under 35 U.S.C. 154(b) by 830 days.

(21) Appl. No.: 12/278,179

(22) PCT Filed: Feb. 6, 2007

(86) PCT No.: PCT/EP2007/051112
§ 371 (c)(1),
(2), (4) Date: Aug. 4, 2008

(87) PCT Pub. No.: WO2007/090830
PCT Pub. Date: Aug. 16, 2007

(65) Prior Publication Data
US 2009/0090464 A1    Apr. 9, 2009

(30) Foreign Application Priority Data

Feb. 7, 2006   (FR) .................................... 06 01123
Mar. 17, 2006  (FR) .................................... 06 02423

(51) Int. Cl.
*B29C 65/16* (2006.01)
(52) U.S. Cl.
USPC ................... 156/272.8; 156/272.2; 156/73.5; 156/303.1; 156/306.6; 156/379.6; 264/445; 264/248; 264/251; 264/442; 264/482
(58) Field of Classification Search
USPC ............ 156/272.8, 272.2, 73.5, 303.1, 306.6, 156/379.6; 264/445, 248, 251, 442, 482
See application file for complete search history.

(56) References Cited

U.S. PATENT DOCUMENTS

| 5,147,086 A   | 9/1992 | Fujikawa et al. |
| 6,035,883 A * | 3/2000 | Benjey ............... 137/202 |

(Continued)

FOREIGN PATENT DOCUMENTS

| DE | 4117415 A1 | 2/1992 |
| DE | 4310453 C1 | 4/1994 |

(Continued)

OTHER PUBLICATIONS

PCT Search Report dated Apr. 19, 2007 for International Application No. PCT/EP2007/051112 (3 p.).

(Continued)

*Primary Examiner* — Timothy Kennedy
(74) *Attorney, Agent, or Firm* — Oblon, Spivak, McClelland, Maier & Neustadt, L.L.P.

(57) ABSTRACT

Process for manufacturing a plastic fuel tank provided with at least one accessory (14) connected to the internal space of the tank via at least one orifice (12) in the wall (10) of the tank, the accessory including a projecting element (24) extending to the outside of the tank, the processing comprising the steps consisting in providing a film (22) that includes a peripheral region (28) and a border region (30) around an opening in the film, in placing the film on the wall of the tank and on the outer surface of the accessory in such a way that the projecting element passes through the film via the opening, in welding the film over its entire peripheral region to the wall of the tank, and in welding the film, over its entire border region, to the outer surface of the accessory.

19 Claims, 2 Drawing Sheets

(56) References Cited

U.S. PATENT DOCUMENTS

| | | |
|---|---|---|
| 6,843,267 B1 | 1/2005 | Van Schaftingen et al. |
| 6,915,812 B2 * | 7/2005 | Frohwein .................. 137/202 |
| 2002/0130515 A1 * | 9/2002 | Mlyajima et al. ............ 285/201 |
| 2002/0179252 A1 | 12/2002 | Zuehlke et al. |
| 2003/0047563 A1 * | 3/2003 | Reinelt et al. .............. 220/565 |
| 2003/0098062 A1 * | 5/2003 | Engle et al. ................. 137/202 |
| 2003/0124281 A1 * | 7/2003 | Ries et al. .................. 428/35.7 |
| 2003/0150547 A1 * | 8/2003 | Kesti et al. ................. 156/212 |
| 2005/0067415 A1 | 3/2005 | Gerard et al. |
| 2005/0269333 A1 | 12/2005 | Burrington et al. |
| 2005/0284871 A1 * | 12/2005 | Leonard et al. ............. 220/562 |
| 2007/0290414 A1 * | 12/2007 | Criel .......................... 264/531 |

FOREIGN PATENT DOCUMENTS

| | | |
|---|---|---|
| EP | 0576179 A1 | 12/1993 |
| EP | 1253001 A2 | 10/2002 |
| EP | 1285746 A1 | 2/2003 |
| GB | 1393045 | 5/1975 |
| JP | 4341365 A | 11/1992 |
| JP | 9030498 A | 4/1997 |
| WO | WO0121428 A1 | 3/2001 |
| WO | WO03035424 A1 | 5/2003 |
| WO | WO2004069574 A1 | 8/2004 |

OTHER PUBLICATIONS

Search Report dated Dec. 18, 2006 from Institut National De La Propriete Industrielle for French Application No. 0602423 (2 p.).

Search Report dated Oct. 5, 2006 from Institut National De La Propriete Industrielle for French Application No. 0601123 (2 p.).

* cited by examiner

PROCESS FOR MANUFACTURING A FUEL TANK

CROSS-REFERENCE TO RELATED APPLICATIONS

This application is a U.S. national stage application under 35 U.S.C. §371 of International Application No. PCT/EP2007/051112, filed Feb. 6, 2007, which claims priority to French Application No. 0601123, filed on Feb. 7, 2006, and which further claims priority to French Application No. 0602423, filed Mar. 17, 2006, all of these applications being herein incorporated by reference in their entirety for all purposes.

The present invention relates to a process for manufacturing a fuel tank made of a plastic impermeable to gases and liquids.

The plastic fuel tanks used in the industry, in particular in the automotive industry for equipping vehicles, generally include one or more accessories that are associated therewith, such as aeration and venting valves, delivery tubes, various sensors and their connections, and fuel gauge and pumping modules.

These fuel tanks must meet increasingly draconian sealing and permeability requirements. The permitted emission limits have become so low that losses due to leaks and to permeability of the interfaces of the accessories with the tank assume a higher relative proportion in the total losses of the tank/accessories system.

It is known, from Patent Application WO 01/21428, to block off multilayer plastic tank openings, made for introducing an accessory into the tank or for fastening it thereto, with a sheet of multilayer structure compatible with that of the tank, which is welded to the external wall of the latter.

However, that document discloses that the sheets used have a rigidity close to that of the walls of the tank. As a result, these sheets cannot be easily used when the emergent part of an accessory is too bulky or the emergent surface of the accessory is irregular.

In addition, despite the bulge that can be produced near the edge of the sheet, so as to reduce locally the thickness of the plastic layers constituting the multilayer sheet, the level of fuel losses by emission at the point where the sheet is welded to the tank still often remains too high and sometimes even exceeds the very low limits imposed by the latest environmental standards.

Patent Application WO 03/035424 proposes a process for manufacturing a fuel tank in which a flexible film of multilayer structure, comprising at least one fuel barrier layer, is fastened to the tank by welding it to the outer surface of the latter, over the entire periphery of the film. Such a process allows a tank to be manufactured in which the emissions at the interfaces between the tank and the accessory are further reduced. If the accessory is completely covered by the film, good impermeability is obtained. This impermeability is not, however, guaranteed when the accessory comprises, for example, a pipe that emerges at the outside of the tank, that is to say when a projecting element must pass through the film. In this case, an opening is made in the film so as to allow the projecting element to pass through it. Sealing around this opening in the film is provided, according to Patent Application WO 03/035424 by a connection element that can be mounted on the projecting element, by snap-fastening or screwing, in order thereby to clamp the film between the connection element and the outer surface of the accessory. A seal may also be clamped between the film and the outer surface of the accessory. However, this solution does not in general allow the necessary impermeability to be achieved. Furthermore, mounting such a connection element is a task that is both painstaking and expensive.

The object of the present invention is to propose a process for manufacturing a fuel tank with improved permeability.

According to the invention, this objective is achieved by a process for manufacturing a plastic fuel tank provided with at least one accessory connected to the internal space of the tank via at least one orifice in the wall of the tank, the accessory comprising a projecting element extending towards the outside of the tank. According to the invention, the process comprises the steps consisting in providing a film comprising a peripheral region and an opening for allowing the projecting element to pass through it, in placing the film on the wall of the tank and on the surface of the accessory in such a way that the projecting element passes through the film via the opening and in welding the film over its entire peripheral region to the wall of the tank. According to an important aspect of the invention, the film is welded, over the entire border region around the opening in the film, to the surface of the accessory. Such a process makes it possible to fasten the film by welding, not only in its peripheral region but also in its border region around the opening. Thus, it is no longer necessary to provide a connection element that has to be mounted on the projecting element in order to clamp the film between the connection element and the surface of the accessory. Consequently, the manufacture of the fuel tank is simpler and more rapid, thereby also resulting in a reduction in the manufacturing costs. More particularly, the peripheral region and the border region may be fastened in a single operation. Furthermore, the process according to the invention makes it possible to manufacture a fuel tank having better impermeability.

The present process also allows a more complicated configuration of the projecting element to be produced, since the latter no longer necessarily has to allow the use of a connection element mounted by snap-fastening or screwing onto the projecting element.

The term "fuel tank" is understood to mean any type of tank capable of storing a liquid and/or gaseous fuel under various pressure and temperature conditions. More particularly intended are tanks of the type of those encountered in motor vehicles. The term "motor vehicle" is understood to also include cars, motorcycles and lorries.

The term "plastic" is understood to mean any material comprising at least one synthetic resin polymer.

All types of plastic may be suitable. Very suitable plastics belong to the category of thermoplastics.

The term "thermoplastic" is understood to mean any thermoplastic polymer, including thermoplastic elastomers, and also blends thereof. The term "polymer" is understood to mean both homopolymers and copolymers (especially binary or ternary copolymers). Examples of such copolymers are, non-limitingly: random copolymers, linear block copolymers, other block copolymers and graft copolymers.

Any type of thermoplastic polymer or copolymer whose melting point is below the decomposition temperature is suitable. Synthetic thermoplastics that have a melting range spread over at least 10 degrees Celsius are particularly suitable. Examples of such materials include those that exhibit polydispersion in their molecular weight.

In particular, polyolefins, polyvinyl halides, thermoplastic polyesters, polyketones, polyamides and copolymers thereof may be used. A blend of polymers or copolymers may also be used, likewise a blend of polymeric materials with inorganic, organic and/or natural fillers such as, for example, but not limitingly: carbon, salts and other inorganic derivatives, natural fibres and polymeric fibres. It is also possible to use multilayer structures consisting of stacked layers, bonded together, comprising at least one of the polymers or copolymers described above.

Polyolefins have given good results. Among polyolefins, high-density polyethylene (HDPE) is preferred.

The invention relates to a fuel tank provided with at least one accessory located at least partly on the outside of the tank. The term "accessory" is understood to mean any member in general through which liquid or gas passes, or which is in contact with liquid or gas and which fulfils a particular function specific to the fuel system of which the tank forms part, including the function of transferring liquid and/or gas between two other members.

Examples of such accessories include, non-limitingly, the following accessories:
  a container for containing any chemical or physical composition, especially a vapour absorption canister;
  a liquid or gas gauge;
  an electrical connection terminating in a liquid or gas gauge; a liquid or gas pump;
  a safety valve for controllably shutting off the tank in certain particular situations;
  a drainable vessel for collecting liquid;
  an electrical connection for powering the motor for a liquid or gas pump;
  a liquid line terminating in a device for supplying any device, especially an engine; and
  a liquid/vapour separation device.

It is also possible to use any combination of at least two accessories, optionally in the presence of several examples of the same accessory.

The invention relates more particularly to a tank provided with an accessory that includes a projecting element extending to the outside of the tank, such as for example a pipe. In particular, the accessory may comprise valves connected to a ventilation line.

The accessory according to the invention may be made of any material. However, for preference it is mainly based on a plastic, and in particular on a plastic whose dimensional stability is hardly affected by contact with the liquids and gases liable to be contained in the tank, to which the plastic is barely permeable. Polyacetals, polyamides, polyesters and polyvinyl halides give good results. Plastics that are very suitable are polyacetals, in particular POM (polyoxymethylene).

Particularly preferably, the accessory is at least partly made of injection-moulded plastic, that is to say it has been formed by a moulding technique in which the material is injected under pressure into a mould.

The accessory may be based on a material having a low fuel permeability, or made of polyethylene. Preferably, when the component is based on polyethylene, it is treated so as to reduce its permeability. The treatment consists for example in sulphonation or fluorination of the component.

The accessory may be fastened to the tank in any appropriate manner. For example, it may be fastened by clip-fastening (preferably with an intermediate seal to ensure sealing), or by welding. In the latter case, however, this means that the part to be welded has to be compatible with the constituent material of the tank. In the case of a component mainly made of POM intended for an HDPE tank, the component may, for example, be made a two-material component (for example by injection overmoulding HDPE onto POM).

The accessory may be located completely outside the tank. One example is a module mounted on one wall of the tank and fulfilling a particular function involving the presence of fuel. The accessory may also be located only partly outside the tank. In this case, it passes through the wall of the latter and is provided with an interface with this wall which is sealed relative to gases and liquids.

The accessory is covered with a protective device that improves the impermeability of the tank/accessory assembly. In other words, the presence of the protective device allows the fuel losses at the interface between the accessory and the tank to be significantly reduced. This protective device is a film, preferably of multilayer structure, that is to say a laminated structure resulting from the stacking of several layers each comprising at least one thermoplastic material, the thickness and the nature of the layers of which are such that the film is substantially more flexible than the wall of the tank. Preferably, the film is flexible and easily deformable by simple manual action.

The film has a surface of various types. For example, it may constitute a convex surface having a shape bounded by more or less circular or elliptical curves, or on the contrary, having sharp angles, such as rectangular or polygonal shapes. The film may also have a non-convex surface that includes at least one convex surface located on the inside of the surface of the film. In each of these convex surfaces included within the non-convex surface of the film, the multilayer structure is interrupted so as to leave an enclosed space in the non-convex surface.

According to the invention, the film advantageously includes at least one fuel barrier layer. The term "fuel barrier layer" is understood to mean a layer impermeable to gaseous and liquid fuels. The barrier layer generally comprises a barrier resin. Any known barrier resin may be present in the barrier layer, provided that it is effective with respect to the fluid fuels liable to be in contact with the tank and/or the accessory, particularly hydrocarbons, and provided that it is compatible with the technique for manufacturing the structure of the multilayer film.

Among possible resins, mention may be made, non-limitingly, of polyamides or copolyamides and random ethylene/vinylalcohol copolymers. A blend of various barrier resins is also possible. Very good results have been obtained with a barrier layer comprising a barrier resin made of a random ethylene/vinylalcohol copolymer.

The film may have been obtained by any known technique resulting in the manufacture of a thin and flexible multilayer structure. One possible technique is the technique of extruding a multilayer film through a sheet die. Another possible technique is the compression moulding of a multilayer sheet.

According to the invention, the film covering the accessory of the tank is fastened to the tank by a weld, which is located around the entire outer peripheral region of the film and the entire border region around the opening of the film, but only there (i.e. there remains a non-welded region between the welded peripheral region and the welded central border region).

The film may be welded in a variety of ways. All types of welding that are compatible with the plastics to be assembled are suitable. Preferably, the nature of the welding is of the infrared or laser radiation welding type. In this case, the film may advantageously be welded to a peripheral zone (both internally—around the central opening—and externally—around the perimeter of the film) larger than with other types of welding. A weld width of just 20 mm is possible with laser radiation welding. Such a "wide" zone may be obtained by successive, parallel and partially overlapping scans. Thus, it is possible in practice to make 1 to 6 passes each 4 to 5 mm in width so as to produce a weld whose width may vary from 4 to 20 mm.

The opening in the film may have a cross section corresponding more or less to the external cross section of the projecting element. Thus, the opening in the film is as small as possible and the film allows only the projecting element to pass through it.

According to one method of implementing the process, the film is cut and preformed by thermoforming, independently of the fuel tank, before carrying out the welding to the tank and the accessory. The preforming of the film by thermoforming consists in giving it a shape that approximates the shape of the external surface of the accessory to be protected. Preferably, the film is preformed by non-elastic deformation.

Before carrying out the welding, the film is advantageously pressed against the wall of the accessory and of the tank in the vicinity of this accessory by the creation of a vacuum between the film and the wall of the tank, and between the film and the surface of the accessory respectively. This embodiment forms the subject matter of a copending application in the name of the Applicant. In this embodiment, the Applicant has surprisingly found that it is sufficient to create a vacuum at the periphery of the film and that it is unnecessary to create a vacuum around the perimeter of the opening, and in particular when the film flanks the accessory, as this allows the leakage path to be reduced. This path may be further reduced by modifying the geometry of the film so that the opening is in a hollow (or concave relief) of the film (i.e. to ensure that the film is in staircase form and that the first step of this staircase—that which terminates at the opening, i.e. slightly descending, so as to ensure sealing naturally by gravity—bears on the accessory).

Preferably, the projecting element comprises a pipe that opens to an atmosphere external to the tank.

The layer of the film directly in contact with the wall of the tank, or the accessory respectively, may comprise a composition that is opaque to the laser radiation. The quality of the laser welding of the film may thus be improved. The term "composition opaque to the laser radiation" is understood to mean a composition that absorbs and/or reflects a substantial proportion of the laser radiation energy. An example of such a composition giving good results is a carbon black filler. This composition is advantageously distributed uniformly within the polymeric material of the layer directly in contact with the wall of the tank.

Preferably, the film has a constant thickness and the fuel barrier layer is uniform. This ensures greater fuel impermeability. However, it is not excluded to use a film having a thinned region at the periphery of the film over a distance at least equal to the width of the welding region. The thinned region may be devoid of a fuel barrier layer. The thickness of the layer without the barrier function is thus reduced around the periphery of the film in such a way that, at least in the region welded to the wall of the tank, the cross section of the fuel permeation channel is reduced.

The film may comprise at least one layer containing a polyolefin. Preferably, the polyolefin is high-density polyethylene (HDPE). Particularly preferably, the polyethylene-containing layer also includes a composition opaque to the laser radiation. An HDPE layer containing carbon black has given excellent results.

BRIEF DESCRIPTION OF THE DRAWINGS

Other particular details and features of the invention will become apparent from the description of a few advantageous embodiments presented below, by way of illustration, with reference to the appended drawings. These show:

In the figures, the same reference symbols denote identical elements.

FIGS. 1 and 2 show a wall 10 of a fuel tank in which an orifice 12 for mounting an accessory 14 has been provided. The wall 10 includes, at the orifice 12, a seat 16 for housing a shoulder 18 of the accessory 14. In general, the accessory 14 is connected to the wall 10 of the tank by a weld between the shoulder 18 and the seat 16. The seat 16 and the shoulder 18 form an interface 20, the impermeability of which is not in general sufficient to meet the latest environmental standards. To improve the impermeability of the fuel tank at the interface 20, a film 22 is placed on the wall 10 of the tank and on an outer surface 23 of the accessory 14 so as to cover the interface 20 between the wall 10 of the tank and the accessory 14. When the accessory 14 includes a projecting element 24 extending to the outside of the tank, the film 22 is provided with an opening preferably having a cross section corresponding substantially to the external cross section of the projecting element 24. Such a projecting element 24 is generally present when the accessory 14 includes a pipe 26 connecting the space inside the fuel tank with a space on the outside of the fuel tank.

Figure 1:
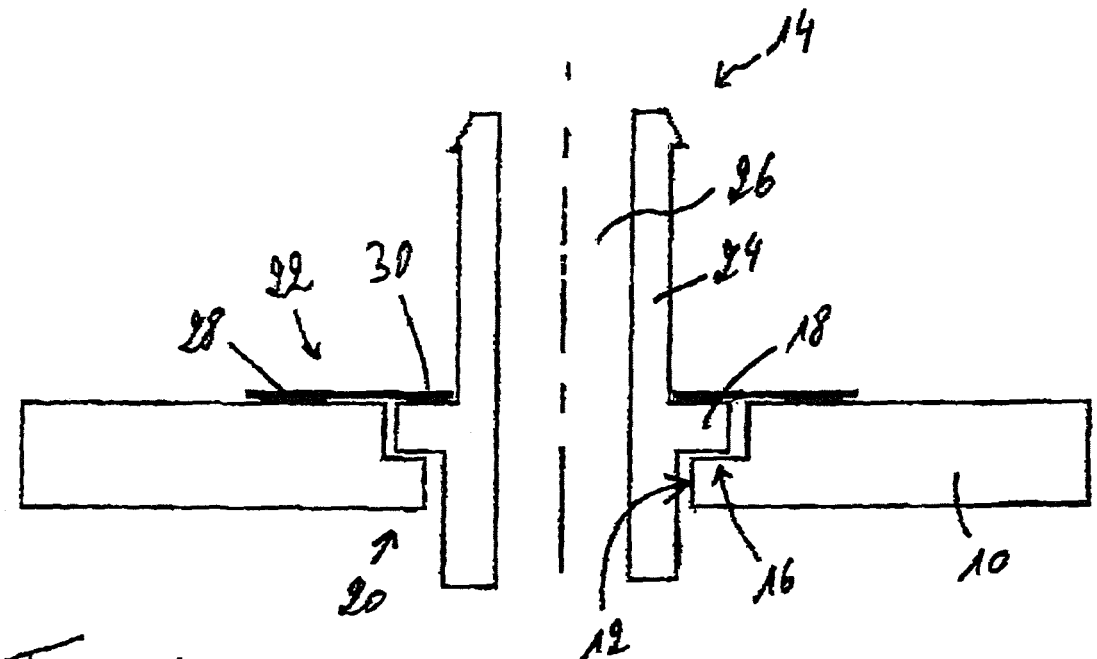
FIG. 1: a sectional view of an accessory mounted in an orifice of a fuel tank manufactured according to one embodiment of the invention.

Such a ring-shaped film is also called a "doughnut".

Advantageously, the film 22 has a multilayer structure, for example comprising three layers, with a total thickness of 0.3 mm, which includes an EVOH barrier layer sandwiched between two HDPE layers, the HDPE layer placed on the wall 10 of the tank typically being filled with 0.25% by weight of carbon black. The film 22 is welded over its entire peripheral region 28 to the wall 10 by scanning diode laser radiation used in pulsed mode (laser of the FAP, YAG type). According to the invention, the film 22 is also welded to the outer surface 23 of the accessory 14 over a border region 30 around the opening in the film 22.

In the embodiment according to FIG. 1, the seat 16 is formed so that the shoulder 18 of the accessory 14 is placed inside the orifice 12. The surface of the shoulder 18 to which the film 22 is welded is flush with the outer surface of the wall 10 so that the film 22 used is a flat film.

Figure 2:
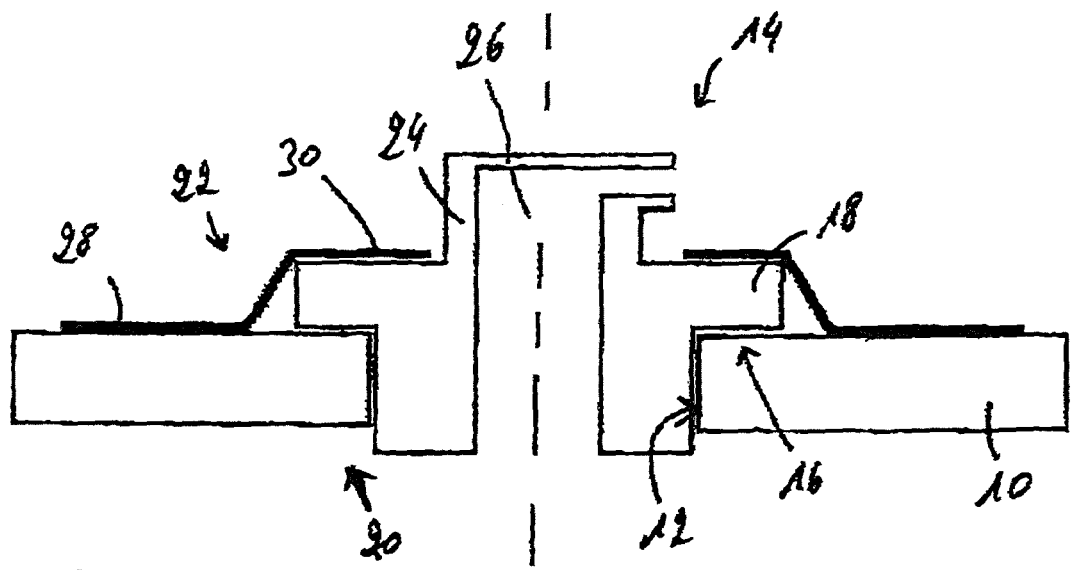
FIG. 2: a sectional view of an accessory mounted in an orifice of a fuel tank manufactured according to another embodiment of the invention.

In the embodiment according to FIG. 2, the seat 16 is formed so that the shoulder 18 of the accessory 14 is placed outside the orifice 12. The surface of the shoulder 18 to which the film 22 is welded is stepped relative to the outer surface of the wall 10, so that the film 22 used is a thermoformed film in order to give the film a shape that approximates the shape of the outer surface of the tank/accessory interface to be protected.

Figure 3:
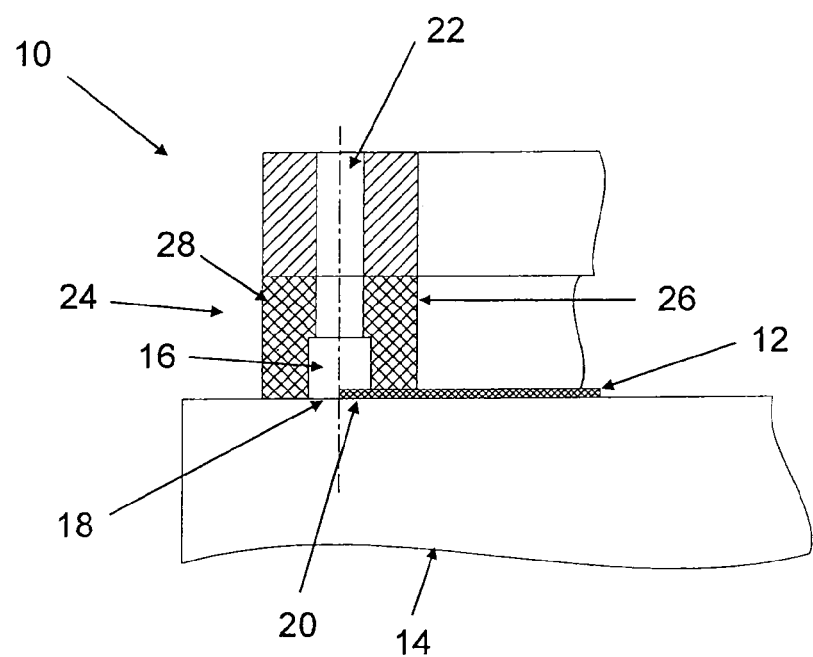
FIG. 3: shows one embodiment of the invention where a vacuum is created at the periphery of the film.

Reference Symbols
10 wall of a fuel tank
12 orifice
14 accessory
16 seat
18 shoulder
20 interface FIG. 3 shows one embodiment of the invention where a vacuum is created at the periphery of the film. As diagrammed in FIG. 3, a radial end of a vacuum tool 10 used to improve the contact between a flexible film 12 and a wall of a fuel tank 14. The vacuum tool 10 comprises a suction chamber 16 comprising an opening 18 directed towards both the flexible film 12 and the tank 14. The opening 18 in the suction chamber 16 is peripheral and formed so as to flank the edge 20 of the flexible film 12 over its entire periphery. The vacuum tool 10 further comprises at least one suction channel 22 for removing the air from the suction chamber 16 (FIG. 3 illustrates just a section through such a channel).

The opening 18 in the suction chamber 16 is provided with a peripheral seal 24 directed towards both the flexible film and the tank 14. When the vacuum tool 10 is in its working position, as shown in FIG. 3, a first portion 26 of the peripheral seal 24 rests on the flexible film 12, while a second portion 28 of the peripheral seal 24 rests on the tank 14. The edge 20 of the flexible film 12 is thus positioned between the first and second portions 26, 28 of the peripheral seal 24. Thus the edge 20 of the flexible film 12 communicates with the suction chamber 16 placed between the two portions 26, 28.

When a suction pump (not shown) connected to the suction channel 22 is turned on, the air in the suction chamber 16 is sucked out, as is. in turn, the space between the flexible film 12 and the tank 14. Thus, the air is removed from beneath the flexible film 12. The vacuum thus created ensures that the flexible film 12 comes into intimate contact with the wall of the tank 14.

The invention claimed is:

1. A process for manufacturing a plastic fuel tank provided with at least one accessory connected to the internal space of the tank via an orifice in a wall of the tank, the process comprising:
   interfacing the accessory with the wall of the tank at the orifice,
   providing a film comprising a peripheral region and an opening for letting the projecting element of the accessory pass through it;
   placing the film on the wall of the tank and on the outer surface of the accessory so that the projecting element passes through the film via the opening; and
   welding the film in a single welding operation, over an entire peripheral region of the film, to the wall of the tank, and over an entire central border region of the film around the opening in the film to the outer surface of the accessory, while leaving a non-welded region between the welded peripheral region and the welded central border region;
   wherein
   the accessory is a molded unit which projects into the tank and extends to the outside of the tank,
   the accessory is molded to a shape which interfaces with the wall of the tank, and
   the interface between the accessory comprises a shoulder on the accessory and a seat in the tank wall at the orifice which houses the shoulder of the accessory.

2. The process according to claim 1, wherein the film is welded by scanning the peripheral region and the central border region to be welded with laser or infrared radiation.

3. The process according to claim 1, wherein the opening in the film has a cross section corresponding more or less to the external cross section of the projecting element.

4. The process according to claim 1, wherein the film is cut and preformed by thermoforming, independently of the fuel tank, before being welded to the tank and the accessory.

5. The process according to claim 1, wherein, before the welding is carried out, a vacuum is created between the film and the wall of the tank, and between the film and the outer surface of the accessory respectively.

6. The process according to claim 1, wherein the projecting element comprises a pipe that opens to the atmosphere external to the tank.

7. The process according to claim 1, wherein the layer of the film directly in contact with the wall of the tank, and with the outer surface of the accessory respectively, includes a composition opaque to the laser radiation or to the infrared radiation.

8. The process according to claim 1, wherein the film has a multilayer structure that includes at least one fuel barrier layer.

9. The process according to claim 1, wherein the film includes at least one polyolefin-containing layer.

10. The process according to claim 2, wherein the welding is by laser scan and a width of the weld is from 4 to 20 mm.

11. The process according to claim 10, wherein the weld is produced by making from 1 to 6 scans of the laser radiation, wherein the successive scans are parallel and overlapping.

12. The process according to claim 4, wherein the film is preformed to a shape that approximates the shape of a external surface of the accessory.

13. The process according to claim 7, wherein the composition opaque to the laser radiation or to the infrared radiation comprises carbon black.

14. The process according to claim 8, wherein the barrier layer comprises at least one resin selected from the group of resins consisting of a polyamide, a copolyamide, a random ethylene/vinyl alcohol copolymer and a mixture thereof.

15. The process according to claim 14, wherein the barrier layer is a random ethylene/vinyl alcohol copolymer.

16. The process according to claim 1, wherein a surface of the film is convex and is bounded by more or less circular or elliptical curves.

17. The process according to claim 1, wherein a surface of the film is convex, having a rectangular or polygonal shape.

18. The process according to claim 1, wherein the film is more flexible than the wall of the tank.

19. The process according to claim 1, wherein the film is flexible and deformable by manual action.

* * * * *